Patented June 4, 1940

2,203,443

UNITED STATES PATENT OFFICE 2,203,443

METHOD OF PREPARING DETERGENT

John Ross, New York, N. Y., and Joseph Edward Mitchell, Jersey City, N. J., assignors to Colgate-Palmolive-Peet Company, Jersey City, N. J., a corporation of Delaware No Drawing. Application March 16, 1938, Serial No. 196,270

15 Claims. (Cl. 260—504)

This invention relates to the preparation of organic chemical compounds, and more particularly to the purification of sulphonic acids and organic acid sulphates obtained by the action of sulphuric acid or equivalent "sulphonating" agents upon organic materials.

In the preparation of "sulphonated" materials, such as sulphonated mineral oils or mineral oil extracts, a varying proportion of the original oil is left unsulphonated at the end of the action of the sulphonating agent. This unreacted portion hereinafter referred to as "unsulphonated oil" is usually paraffinic in character, but it may contain some polymerized hydrocarbons and resinified material. When the amount of unsulphonated oil is large, it may partially separate from the aqueous solution of sulphonic acids-organic acid sulphates forming a layer which may be removed from the aqueous solution of sulphonated material by well-known methods, as by decantation. However, the aqueous layer, by reason of the exceptionally good solvent and dispersive properties of the sulphonated products retains an appreciable quantity of the unreacted hydrocarbons.

The presence of unreacted hydrocarbons has definite detrimental effects upon the sulphonates which is shown by a marked lowering of their wetting, washing and emulsifying efficiency. In addition, these impurities are often susceptible to discoloration by the action of air, heat or light, and this discoloration is reflected in the color of the final sulphonated product. Water solutions of sulphonates containing such unsulphonated oil are often characterized by an undesirable haziness even when the concentration is very low. For these reasons it is obviously highly desirable to remove the water-insoluble organic materials from the sulphonated product.

Numerous methods have been devised for the removal of the excess unsulphonated oil, but the solvent and emulsifying properties of the sulphate or sulphonate reaction products render the separation of the unreacted material and other insoluble impurities an extremely difficult problem. The usual method is to dilute the reaction product with water, thus decreasing the miscibility of the unreacted material, and this dilute water solution is then extracted with a volatile water-immiscible solvent such as benzol.

To illustrate, a petroleum extract obtained by treatment of a given petroleum cut with a selective solvent for the more aromatic and olefinic constituents will usually consist of a mixture of a major proportion of aromatic and olefinic hydrocarbons and a minor proportion of naphthenic and paraffinic hydrocarbons; the proportions of these ingredients depending mainly on the composition of the original oil and the extractant used. If this mixture is sulphonated with a strong sulphonating agent such as fuming sulphuric acid, sulphur trioxide, or chlorsulphonic acid, preferably in the presence of liquid sulphur dioxide or other suitable solvent, a complex mixture of organic sulphonic acids and organic acid sulphates will result. The reaction mixture will also contain unreacted or polymerized hydrocarbons together with the solvent and an excess of sulphonating agent. The unreacted hydrocarbons remaining after the sulphonation treatment are usually more paraffinic in character. It has been the practice in removing the unreacted hydrocarbons and polymerized materials to evaporate the solvent (e. g., liquid sulphur dioxide) after the reaction has been completed and to pour the sulphonic acid and sulphuric acid mixture into water. Some of the unsulphonated hydrocarbons may form a supernatant oily layer which is removed. The remaining water layer containing dissolved sulphonic acids and sulphuric acid is extracted with organic liquids, e. g., benzol or other suitable solvent, to remove the remaining hydrocarbon material.

The methods heretofore known have been found to be inefficient, laborious, expensive and hazardous. They are expensive because organic solvents of relatively high purity are commonly required as extractants, examples being ether, gasoline and benzol, in addition to the fact that removal of these extractants from the extracted material necessitates volatilization of the extractant usually by the use of high temperatures. The high inflammability of these extracts render their use hazardous when utilized in commercial processes. An example of the prior art processes is disclosed in the U. S. Patent No. 2,036,469 to Edward Field, who employs extractants of the type herein mentioned. The difficulty of removing the residual oil is also illustrated by the fact that it is usually left in the final product as shown by U. S. Patent No. 1,836,429, to James Baddiley et al. and No. 1,955,859, to R. T. Osborn et al.

It is an object of the invention disclosed herein to remove unreacted hydrocarbons and other organic impurities from the sulphonates formed by the action of sulphonation agents on organic materials.

Another object is to provide an inexpensive, safe and simple process for extracting organic impurities, as unreacted oil, from sulphonates by treating these compounds with liquid sulphur dioxide and removing the sulphur dioxide layer formed.

A still further object is the purification of sulphonated materials obtained by the action of oleum, sulphur trioxide, chlorsulphonic acid, or equivalent sulphonating agents on liquid sulphur dioxide extracts of petroleum by diluting the reaction mass with water and removing the sulphur dioxide layer.

Other objects of the invention will in part be obvious and will in part appear hereinafter.

We have discovered that liquid sulphur dioxide can be used with advantage as a solvent medium for extracting unreacted or unsulphonated oil from the sulphonated product obtained when mineral oil or other hydrocarbons are reacted with sulphuric acid or equivalent sulphonating agent. We have found that sulphonic acids and organic acid sulphates are relatively insoluble in liquid sulphur dioxide as compared to their great solubility in water. We have also determined that the solubility of liquid sulphur dioxide in sulphuric acid up to a concentration of about 100% is very small over a temperature range of about −30° C. to about 75° C. Accordingly, this invention in its broadest aspects contemplates the treatment of sulphonic acids and organic acid sulphates which contain hydrocarbons as impurities with liquid sulphur dioxide and water and removing the liquid sulphur dioxide layer which is formed. By a few successive treatments in this manner, substantially all the impurities are removed and the sulphonates are substantially pure, and consequently more desirable because of their unimpaired detergent properties. The liquid sulphur dioxide may be readily freed of the impurities by vaporization and condensation, by reason of its low boiling point, and used over and over.

When the process of this invention is utilized before removal of excess sulphuric acid or equivalent sulphonating agent employed in the sulphonating reaction, about an equal volume of liquid sulphur dioxide is added to the reaction mixture and then sufficient water to reduce the acid concentration to below 100%, preferably about 20% to about 80%. The order of adding liquid sulphur dioxide and water may be reversed. The mixture separates sharply into two or three liquid phases, manifested as distinct layers, according to the degree of dilution of the sulphuric acid. One of the phases consists mainly of liquid sulphur dioxide and contains the major portion of the unsulphonated hydrocarbons, and the other phase contains the aqueous solutions of sulphuric acid, sulphonic acids and organic acid sulphates. A third phase is likely to be formed when the concentration of sulphuric acid is greater than about 30%, because above that approximate concentration we have found that the sulphonic acids are relatively insoluble in the acid phase, thus forming or causing a third phase. The water added to dilute the reaction product is divided between the sulphonic acid and sulphuric acid so that when three layers are formed the concentration of the sulphuric acid layer does not bear a simple relationship to the amount of water added.

Naturally, the position of the two or three layers or phases varies according to their respective specific gravities. The acid layer will have a specific gravity greater or less than the liquid sulphur dioxide layer depending upon the degree of dilution with water; the greater the dilution, the less will be the specific gravity of the acid layer, and the greater the tendency to form an upper layer. It is desirable to form layers having widely different specific gravities in order to promote separation.

The liquid sulphur dioxide phase or layer may be removed by known methods, and will be found to contain most of the unreacted hydrocarbons and almost no sulphuric or sulphonic acids. The sulphonic acid and sulphuric acid solution may be successively extracted or washed with liquid sulphur dioxide until it is substantially free of unsulphonated or unreacted hydrocarbons. Neutralization then gives a product relatively free from oil. The sulphur dioxide may be recovered by known methods, as pointed out above, for reuse leaving the unsulphonated oil for any use to which it is applicable. The process of this invention lends itself to continuous-countercurrent procedure by which the method may be most effectively and economically carried out.

It is especially convenient to use this process where the sulphonation has been carried out in the presence of liquid sulphur dioxide, examples of which are disclosed in copending applications Serial Nos. 117,096, filed December 21, 1936, and 138,463, filed April 22, 1937, by Robert L. Brandt, now Patents Nos. 2,149,661 and 2,149,662, respectively, issued May 7, 1939. In such cases water is slowly added with agitation to the final reaction mass containing liquid sulphur dioxide, excess sulphuric acid, organic acid sulphates, sulphonic acids and the unreacted hydrocarbons, until the concentration of sulphuric acid is less than 100% and preferably about 20% to about 80%. The addition of water is accomplished with the aid of cooling in such a manner that excessive rises in temperature are prevented.

In a very short time, sometimes immediately, two or three phases will form as described heretofore. Hence, by simply diluting the sulphuric acid with the addition of a sufficient quantity of water to effect the desired concentration of sulphuric acid before removing the sulphur dioxide, an efficient separation of a large proportion of unreacted oil may be made. Further removal of the remaining small proportion of oil is achieved by successively washing the acid solution with fresh liquid sulphur dioxide, either by batch, intermittent or continuously countercurrent methods, as more fully disclosed elsewhere herein.

The principle of this separation can be extended by introducing a hydrocarbon or other solvent soluble in the liquid sulphur dioxide phase, which while not substantially altering the insolubility of the sulphonic acid in liquid sulphur dioxide will increase the solubility of unsulphonated hydrocarbons therein.

It is possible to introduce into the mixture before or during extraction, other water-soluble and acid-stable agents that are desired to be retained in the final sulphonate product. For example, if petroleum sulphonic acids, long-chain alcohol sulphates or even inorganic substances are to be incorporated into the final reaction product, these materials may be added directly with the diluting water or with the sulphuric acid to the sulphonated materials to be extracted.

We prefer to operate within a range of from about −30° C. to about +30° C., although lower or higher temperatures may be employed. The process may be carried out at higher temperatures, but it must be recognized that under such conditions of higher temperatures and pressures technical difficulties such as are due to corrosion are increased.

For a fuller understanding of the objects of the invention, reference should be had to the following examples which are given merely to further illustrate the invention and are not to be construed in a limiting sense:

*Example I*

250 g. of Gulf Coast (Texas) transformer oil Edeleanu Extract were dissolved in 250 ccs. liquid sulphur dioxide and treated with 250 g. of 20% oleum. When reaction was completed 600 g. of water were carefully added with agitation and cooling so that the final concentration of free sulphuric acid was about 20%. The lower layer of liquid sulphur dioxide was drawn off and the solution of sulphuric-sulphonic acid was shaken with a second, third and fourth volume of liquid sulphur dioxide at −10° C. The successive sulphur dioxide extracts contained 21 g., 20 g., 8 g., and 6 g. of unsulphonated oil and upon analysis it was found that there were 14 g. of oil left in the sulphonic-sulphuric acid layer which could have been removed by further extraction; thus about 80% (55 g. out of a possible 69 g.) of the residual oil was extracted by the liquid sulphur dioxide. The remaining oil left in the sulphonate product corresponds to only about 2.4% of the dry salt product.

*Example II*

100 g. of Gulf Coast (Texas) transformer oil Edeleanu Extract (caustic pre-treated) were dissolved in 200 cc. of liquid sulphur dioxide and sulphonated with 100 g. of 20% oleum for one hour. At the end of this time 25 g. of water were carefully added with efficient stirring and the mixture allowed to settle. Three layers were formed. The lower layer consisted of 80% sulphuric acid; the middle layer of sulphonic acids which contained a small amount of water; and the upper layer of 175 cc. of liquid sulphur dioxide containing unsulphonated oil was removed at −10° C. The sulphonic-sulphuric acid layers were stirred with a second 200 cc. of fresh liquid sulphur dioxide which in turn was drawn off. In this way the sulphonic-sulphuric acid layers were washed four times with equal volumes of liquid sulphur dioxide. Finally the sulphonic-sulphuric acid layer was neutralized and analyzed so that the remaining residual oil could be estimated. It was found that about 74% (20 g. out of a possible 27 g.) of the residual oil was extracted by sulphur dioxide from the diluted sulphonation mixture. The percentage of oil left in the dry salt prepared by neutralization of the sulphuric and sulphonic acids after liquid sulphur dioxide extraction, amounted to about 3.5%.

*Example III*

250 g. of California 65 Saybolt viscosity Edeleanu Extract were dissolved in 250 cc. liquid sulphur dioxide and treated with 250 g. of 20% oleum. When the reaction was completed water was added so that the final concentration of the free sulphuric acid was approximately 33.4% $H_2SO_4$. The lower layer of liquid sulphur dioxide was drawn off and the sulphuric-sulphonic acid mixture successively extracted with two more volumes of liquid sulphur dioxide, the extraction being made at a temperature of about +10° C. The successive extracts contained 22 g., 18 g., and 10 g. of oil and after neutralization the product was analyzed and the remaining oil estimated. It was found that liquid sulphur dioxide removed 50 g. out of a total of 57 g. of unsulphonated oil. In other words, the sulphur dioxide extraction removed 87.75% of the residual unsulphonated oil. The percentage of oil remaining in the dry salt obtained by neutralizing the sulphuric-sulphonic acid liquor after sulphur dioxide extraction amounted to about 1.4%.

*Example IV*

196 g. of a low viscosity Edeleanu Extract (Texas Coast) was treated with 253 g. sulphuric acid (94% $H_2SO_4$) for sixty minutes at 130° F. At the end of this time the mixture was diluted so that the sulphuric acid strength was approximately 22%. A small amount (3 g.) of oil separated and was drawn off. This equeous solution was treated at 5° C. with one-fifth its volume of liquid sulphur dioxide, agitated and the lower layer of $SO_2$ extract drawn off. In three such extractions 8 g., 7 g. and 4 g. were taken out successively. The remaining solution contained 3 g. of residual oil. Hence by the above procedure 88% of the unsulphonated oil can readily be removed (22 g. out of 25 g.). The unsulphonated oil remaining in the sulphonated product corresponds to about 0.6% of the dry salt.

*Example V*

50 g. of tetraisobutylene were mixed with 50 g. acetic anhydride and treated with 75 g. of 100% sulphuric acid at 0° C. for two hours. At the end of this time the mixture was poured into ice water and diluted so that the strength of the sulphuric acid was about 20%. Some oil separated and was drawn off (6 g.). The aqueous mixture was then extracted with liquid $SO_2$ (one-fifth volume) three times at +5° C. In this way 14 g., 4 g., 3 g. of unsulphated oil was extracted. Finally it was found that the remaining aqueous solution contained 1 g. unsulphated oil, so that 96% of the unsulphated oil had been removed (27 out of 28 g.). The unsulphated oil remaining in the final product was less than 1.0% of the dry product. The product produced is substantially tetraisobutane acid sulphate.

*Example VI*

250 g. California 65 Saybolt viscosity Edeleanu Extract were dissolved in 250 cc. liquid sulphur dioxide and treated with 250 g. of 20% oleum. When the reaction was completed water was added so that the final concentration of the free sulphuric acid was about 70% $H_2SO_4$ and this lower layer of sulphuric acid was separated leaving an intermediate layer of sulphonic acid (aqueous solution) substantially free from sulphuric acid. (In general such a separated mixture of aqueous sulphonic-alkyl sulphuric acids contains up to 10% $H_2SO_4$ and to this extent the separation of sulphuric acid is incomplete.) The top layer of liquid sulphur dioxide, containing unsulphonated oil, was likewise removed and the sulphonic acids diluted with water to a concentration of 30% and successively extracted at +5° C. with three further quantities of liquid sulphur dioxide. After the sulphonic acids had been neutralized the product was analyzed and the remaining oil estimated. It was found that the liquid sulphur dioxide had removed 52 out of a total of 58 g. of unsulphonated oil or approximately 90% of the residual unsulphonated oil.

The preceding examples, illustrating the process of this invention, were carried out in suitable, closed vessels so constructed and arranged that they are capable of withstanding and maintaining all pressures required in this process, and including suitable equipment for controlling conditions within the vessels such as agitation, temperature, etc.

Any of the common "sulphonating agents" such as sulphuric acid, oleum, sulphur trioxide, chlorosulphonic acid and the like may be used. Even though the "sulphonated" product is referred to as such, it is obvious from the foregoing examples that the invention is equally applicable to the reaction product of the sulphonating agent and organic materials whether it may be represented as R-SO₃H or R-SO₄H, R being the organic radical; i. e., whether the product is a "sulphonate" or a "sulphate".

The foregoing procedure can be applied to any similar system and is not limited to the specific examples disclosed but can be utilized in connection with the sulphonation of, or sulphation of aromatic hydrocarbons, olefines, chloroolefines and any other substances soluble in liquid sulphur dioxide or in water immiscible mixtures containing liquid sulphur dioxide.

Having described our invention, what we claim as new and desire to secure by Letters Patent is:

1. In the process of removing unsulphonated material from the reaction product of a sulphonating agent and an organic material soluble in a liquid solvent of the class consisting of liquid sulphur dioxide and water immiscible mixtures containing liquid sulphur dioxide, the steps which comprise treating the product with liquid sulphur dioxide and removing the liquid sulphur dioxide containing said unsulphonated material.

2. In the process of removing unsulphonated material from the reaction product of a sulphonating agent and an organic material soluble in a liquid solvent of the class consisting of liquid sulphur dioxide and water immiscible mixtures containing liquid sulphur dioxide, the steps which comprise adding water and liquid sulphur dioxide to the product and removing the liquid sulphur dioxide containing said unsulphonated material.

3. The process of claim 2, which is carried out within the temperature range of from about −10° C. to about +10° C.

4. The process of claim 2, which is carried out within the temperature range of from about −30° C. to about +30° C.

5. In the process of removing organic, water-insoluble constituents from the reaction product of a sulphonating agent and an organic material soluble in a liquid solvent of the class consisting of liquid sulphur dioxide and water immiscible mixtures containing liquid sulphur dioxide, the steps which comprise treating the impure reaction product with both liquid sulphur dioxide and sulphuric acid of a concentration of not greater than about 100% and removing the liquid sulphur dioxide layer.

6. In the process of purifying a reaction product of sulphuric acid and an organic material soluble in a liquid solvent of the class consisting of liquid sulphur dioxide and water immiscible mixtures containing liquid sulphur dioxide, said product having been prepared in the presence of liquid sulphur dioxide, the steps which comprise adding water with vigorous agitation to the reaction mixture containing the organic material-sulphuric acid reaction product, water-insoluble organic material, excess sulphuric acid and liquid sulphur dioxide, so that the resulting concentration of sulphuric acid is less than 100% and removing the liquid sulphur dioxide layer.

7. In the process of removing organic, water-insoluble constituents soluble in a liquid solvent of the class consisting of liquid sulphur dioxide and water immiscible mixtures containing liquid sulphur dioxide from an organic sulphonate, the steps which comprise the treatment of the organic sulphonate with both liquid sulphur dioxide and sulphuric acid of a concentration of not greater than about 100%, permitting the treated mixture to separate and removing the liquid sulphur dioxide layer.

8. In the process of purifying an organic sulphonate prepared in the presence of liquid sulphur dioxide from organic material soluble in a liquid solvent of the class consisting of liquid sulphur dioxide and water immiscible mixtures containing liquid sulphur dioxide, the steps which comprise adding water with vigorous agitation to the reaction mixture containing the organic sulphonate, water-insoluble organic material, excess sulphuric acid and liquid sulphur dioxide, so that the resulting concentration of sulphuric acid is less than 100%, permitting the resulting mixture to separate into layers and removing the liquid sulphur dioxide layer.

9. In the process of removing organic water-insoluble constituents soluble in a liquid solvent of the class consisting of liquid sulphur dioxide and water immiscible mixtures containing liquid sulphur dioxide from an organic sulphate, the steps which comprise the treatment of the organic sulphate with both liquid sulphur dioxide and sulphuric acid of a concentration of not greater than about 100% and removing the liquid sulphur dioxide layer.

10. In the process of purifying an organic acid sulphate prepared in the presence of liquid sulphur dioxide from organic material soluble in a liquid solvent of the class consisting of liquid sulphur dioxide and water immiscible mixtures containing liquid sulphur dioxide, the steps which comprise adding water with vigorous agitation to the organic sulphate, water-insoluble organic material, excess sulphuric acid and liquid sulphur dioxide, so that the resulting concentration of sulphuric acid is less than 100% and removing the liquid sulphur dioxide layer.

11. In the process of removing water-insoluble constituents from a petroleum sulphonic acid, the steps which comprise the treatment of the impure petroleum sulphonic acid with both liquid sulphur dioxide and sulphuric acid of a concentration of not greater than about 100%, permitting the treated mixture to stand, and removing the liquid sulphur dioxide layer.

12. In the process of purifying a petroleum sulphonic acid prepared in the presence of liquid sulphur dioxide, the steps which comprise adding water with vigorous agitation to the reaction mixture containing the petroleum sulphonic acid, water-insoluble organic material, excess sulphuric acid and liquid sulphur dioxide, so that the resulting concentration of sulphuric acid is less than 100%, permitting the resulting mixture to stand and removing the liquid sulphur dioxide layer.

13. In the process of removing water-insoluble constituents from a sulphonate of a petroleum extract, the steps which comprise the treatment of the impure sulphonate of a petroleum extract with both liquid sulphur dioxide and sulphuric acid of a concentration of not greater than about 100%, permitting the treated mixture to stand, and removing the liquid sulphur dioxide layer.

14. In the process of purifying a sulphonate of a petroleum liquid sulphur dioxide extract, the steps which comprise adding water to the reaction mixture containing the sulphonate of the petroleum extract, water-insoluble organic material, excess sulphuric acid and liquid sulphur dioxide, so that the resulting concentration of sulphuric acid is about 20%, removing the liquid sulphur dioxide layer which contains unreacted oil and successively washing the remaining solution with fresh liquid sulphur dioxide until the residual unsulphonated oil has been completely removed or reduced to the desired concentration, the process being carried out at temperatures of from about —10° C. to about +10° C.

15. In the process of purifying the reaction product of a sulphonating agent and an organic material soluble in a liquid solvent of the class consisting of liquid sulphur dioxide and water immiscible mixtures containing liquid sulphur dioxide, the steps which comprise adding an equal volume of liquid sulphur dioxide to a water solution of the sulphonate, agitating, removing the liquid sulphur dioxide layer and successively washing the sulphonate solution with fresh liquid sulphur dioxide.

JOHN ROSS.
JOSEPH EDWARD MITCHELL.